United States Patent Office 3,063,439
Patented Nov. 13, 1962

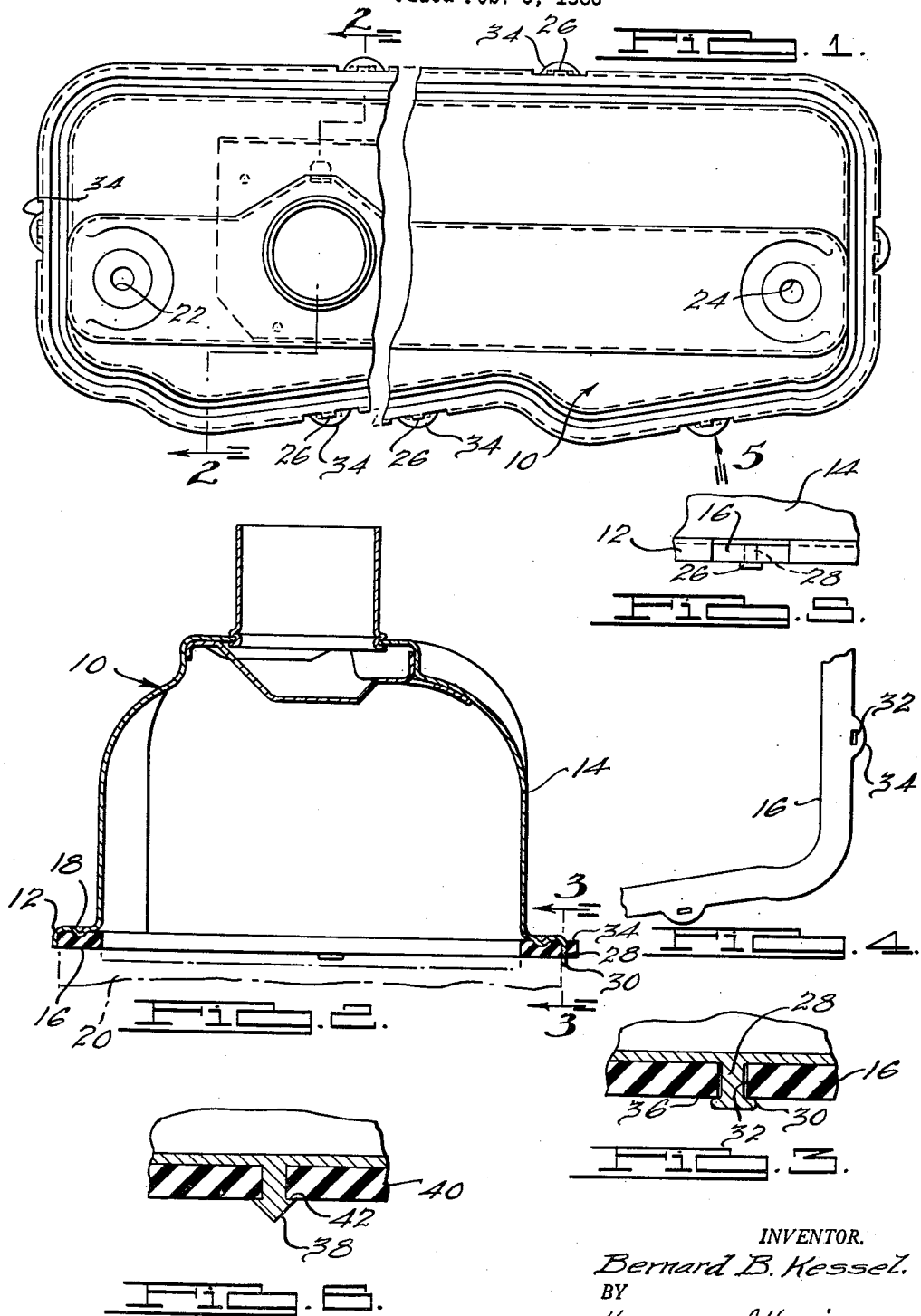

3,063,439
ROCKER CHAMBER COVER AND GASKET
Bernard B. Kessel, Detroit, Mich., assignor to Chrysler Corporation, Highland Park, Mich., a corporation of Delaware
Filed Feb. 9, 1960, Ser. No. 7,587
9 Claims. (Cl. 123—195)

This invention relates to a rocker chamber cover and a gasket which is adapted to be secured thereto by retaining the same in place prior to and during assembly of the rocker chamber cover on an engine.

Heretofore the assembly of the rocker chamber cover and its associated gasket on an internal combustion engine has posed the problem of assembling these three structures together without damage to or misplacement of the gasket, which frequently results in oil leakage from the rocker chamber. Moreover, the methods employed in an attempt to prevent a misplacement of the gasket during the aforesaid assembly have necessarily been time-consuming and costly on a mass production basis since these methods have contemplated securing the gasket to the rocker chamber cover by means of adhesive or by trial and error placement of the gasket during the assembly of the cover to the engine.

The present invention has for its major object the provision of a rocker chamber cover having means thereon for cooperating with means on a gasket to maintain the gasket in its properly placed position on the rocker chamber cover to thereby facilitate assembly of the cover to the engine.

Further objects and advantages of the present invention will become apparent from the following description and drawings in which:

FIGURE 1 represents a top view of a rocker chamber cover;

FIGURE 2 represents a cross-sectional view of the cover and its gasket taken along the line 2—2 of FIGURE 1 in the direction of the arrows;

FIGURE 3 represents a cross-sectional view of a segment of the gasket and cover assembly of FIGURE 2 taken along the line 3—3 thereof in the direction of the arrows;

FIGURE 4 represents an elevational view of a segment of the gasket of the present invention;

FIGURE 5 represents a side view of a segment of the assembly of FIGURE 1 taken in the direction of the arrow 5 thereof; and FIGURE 6 represents a variation of the locking means of FIGURE 3.

Referring to the drawings, a rocker chamber cover 10 in the general shape of an elongated bowl is provided with a continuous half channel shaped edge portion 12 surrounding the bowl-shaped body portion 14 and providing a holder for the gasket 16. A ridge or bead 18 may be provided in the top part of the half channel to allow better sealing between the cover 10 and the gasket when they are secured together by assembly on the engine generally designated 20. The compression of this gasket 16 results from a compression of the cover on the engine by means of bolts adapted to be inserted through apertures 22 and 24 in the cover and threaded into the engine 20.

Spaced around the terminating edge of the half channel are a plurality of locking means 26 comprising a leg portion 28 formed from the half channel 12 and terminating in a T-shaped portion 30 to provide shoulder means. The gasket 16 is provided at spaced intervals with a plurality of elongated apertures 32 extending through the gasket adjacent extended lug portions 34 of the gasket. It is seen from FIGURE 3 that the T-shaped end portion 30 of the locking means 26 is wider than the apertures 32 but is able to be forced therethrough since the gasket 16 is of a resilient material such as rubber, cork, or other typical gasket composition. Moreover, it is seen that after the portion 30 has been pushed through the apertures, the shoulder means on the locking means engages the under side 36 of the gasket adjacent the apertures 32 to lock the gasket into position in the half channel 18 of the cover.

The shape of the locking means 26 as shown in FIGURE 6 may be somewhat varied to allow a pointed or sharpened end portion 38 to be inserted through a gasket 40, which is not provided with any aperture such as apertures 32 in gasket 16. It is noted that as the end 38 of the locking means of FIGURE 6 has been pushed sufficiently through the gasket 40, the shoulders 42 will engage the under side of gasket 40 to retain it in the half channel in the same manner as shown in FIGURE 3.

By the locking means shown and described herein, the elimination of adhesive securement of the gasket to the rocker cover is readily eliminated and the possibility of displacement of the gasket out of its half channel during the assembly of the rocker cover on the engine is practically eliminated and the assembly is thereby significantly expedited.

I claim:

1. The combination of a chamber cover and a gasket for sealing said cover on a surface, comprising tab means on said cover spaced around a peripheral portion thereof lying exteriorly of said surface, a resilient sealing gasket adapted to fit against said cover adjacent said peripheral portion, said tab means being adapted for insertion through portions of said gasket lying exterior to said surface, and shoulder means on said tab means for inhibiting removal of said gasket from said cover.

2. The combination of an internal combustion engine rocker chamber cover and a gasket for sealing the same on said engine, comprising tab means on said cover spaced around a peripheral portion thereof, a resilient sealing gasket adjacent said peripheral portion with said tab means extending through said gasket, and shoulder means on said tab means for engaging portions of said gasket to thereby inhibit removal of said gasket from said cover.

3. The combination of a rocker chamber cover and a gasket for sealing the same on an engine structure comprising tab means on said cover spaced around a peripheral portion thereof, a resilient sealing gasket adapted to fit against said cover adjacent said peripheral portion, lugs on said gasket extending outwardly from said peripheral portion of said cover, aperture means in said lugs for frictionally receiving said tab means, and shoulder means on said tab means for extending through said aperture means and engaging portions of said lugs adjacent thereto to thereby inhibit removal of said gasket from said cover.

4. A rocker chamber cover comprising a bowl shaped body having half channel shaped means extending around the opening thereof and facing outwardly therefrom for receiving gasket means, locking means extending from edge portions of said half channel shaped means and adapted to extend through a gasket, and shoulder means on said locking means spaced from said edge portions and adapted to lock said gasket between said half channel shaped means and said shoulder means.

5. A rocker chamber cover for use in combination with a resilient sealing gasket, comprising a bowl shaped body having a gasket bearing surface extending around the opening of said body and facing outwardly therefrom, locking means extending from edge portions of said surface at substantially right angles thereto and adapted to extend through a gasket, said locking means having a sharp leading edge for penetration of said gasket, and shoulder means on said locking means spaced from said surface for locking said gasket between said bearing surface and said shoulder means.

6. A gasket comprising a body of relatively thin resilient material adapted to be compressed between two structural member to provide a fluid seal therebetween, spaced lug portions on opposite sides of said gasket body extending outwardly therefrom providing areas outside the normal compression area of said gasket, said areas having apertures therein for resiliently receiving rigid locking members.

7. A gasket as clamed in claim 6, wherein said apertures are elongated apertures.

8. An assembly comprising a gasket of relatively thin resilient material and a pair of structural members between which said gasket is compressed to provide a fluid seal, one of said structural members having a plurality of spaced locking tabs extending therefrom and through said gasket outside the normal compression area thereof so as to be interengaged and interlocked with said gasket, said tabs becoming interlocked with said gasket upon relative movement between them normal to said gasket and there being locking means on said tabs for retaining said gasket on said one structural member.

9. An assembly as in claim 8, wherein said locking tabs extend through elongated apertures in said gasket and have locking shoulders straddling said apertures.

References Cited in the file of this patent

UNITED STATES PATENTS

| | | |
|---|---|---|
| 1,381,154 | Wood | June 14, 1921 |
| 1,705,454 | Griffiths | Mar. 12, 1929 |
| 1,730,110 | Bailey | Oct. 1, 1929 |
| 1,884,879 | Sanders | Oct. 25, 1932 |
| 1,919,733 | Kuenzel | July 25, 1933 |
| 1,998,791 | Schanz | Apr. 23, 1935 |
| 2,211,045 | Balfe | Aug. 13, 1940 |
| 2,324,568 | Duggan | July 20, 1943 |
| 2,867,464 | Crampton | Jan. 6, 1959 |
| 2,981,247 | Gaebler | Apr. 25, 1961 |